United States Patent

Nomura et al.

Patent Number: 5,156,754
Date of Patent: Oct. 20, 1992

[54] METAL-POWDER FILLED EPOXY RESIN MOLD

[75] Inventors: Hideo Nomura; Nobuyuki Yamaguchi, both of Yokohama City; Hidekazu Ishimura, Fuji City; Isao Takagi, Samejima, all of Japan

[73] Assignees: Nissan Motor Co., Ltd., Yokohama City; Asahi Kasei Kogyo Kabushiki Kaisha, Osaka, both of Japan

[21] Appl. No.: 562,856

[22] Filed: Aug. 3, 1990

[30] Foreign Application Priority Data

Aug. 7, 1989 [JP] Japan ............... 1-202919
Oct. 13, 1989 [JP] Japan ............... 1-119220
Oct. 13, 1989 [JP] Japan ............... 1-265010

[51] Int. Cl.⁵ ............................. B28B 7/00
[52] U.S. Cl. ......................... 249/134; 249/135
[58] Field of Search ................. 249/134, 135

[56] References Cited

U.S. PATENT DOCUMENTS

| | | | |
|---|---|---|---|
| 3,216,074 | 11/1965 | Harrison | 249/135 |
| 3,883,114 | 5/1975 | Harris et al. | 425/DIG.12 |
| 3,932,096 | 1/1976 | Kartman | 425/398 |
| 4,125,351 | 11/1978 | Alfter et al. | 425/384 |
| 4,225,109 | 9/1980 | Yotsutsuji et al. | 249/135 |
| 4,468,363 | 8/1984 | Miessler | 264/128 |
| 4,509,358 | 4/1985 | Krowl | 249/134 |
| 4,834,929 | 5/1989 | Dehoff et al. | 249/134 |
| 4,940,561 | 7/1990 | Fritz | 249/135 |

FOREIGN PATENT DOCUMENTS

| | | | |
|---|---|---|---|
| 2319477 | 2/1977 | France | 249/135 |
| 53-67712 | 6/1978 | Japan | 249/135 |
| 53-140364 | 12/1978 | Japan | 249/134 |
| 56-38213 | 4/1981 | Japan | 249/134 |
| 62-110823 | 5/1987 | Japan . | |
| 62-110824 | 5/1987 | Japan . | |
| 62-238294 | 10/1987 | Japan . | |
| 63-230308 | 9/1988 | Japan . | |
| 63-270104 | 11/1988 | Japan . | |
| 63-278808 | 11/1988 | Japan . | |
| 63-307907 | 12/1988 | Japan . | |
| 64-48210 | 3/1989 | Japan . | |
| 1-146710 | 6/1989 | Japan | 249/134 |
| 408805 | 7/1974 | U.S.S.R. | 249/135 |

Primary Examiner—Jay H. Woo
Assistant Examiner—Scott Bushey
Attorney, Agent, or Firm—Foley & Lardner

[57] ABSTRACT

In order to increase the performance of a mold of thermosetting resin, metal powder is dispersed in the resin mold which has a dense and voidless structure. The mold may be mounted on a back-up member of metal. In this case, the bonding between the mold and the back-up member is much assured when metal balls are contained in the mold near the back-up member. Furthermore, the mold may be electrically metal-plated. In this case, the mold is coated with a conductive plastic paint before being subjected to the electric metal plating in an electrolytic solution.

24 Claims, 13 Drawing Sheets

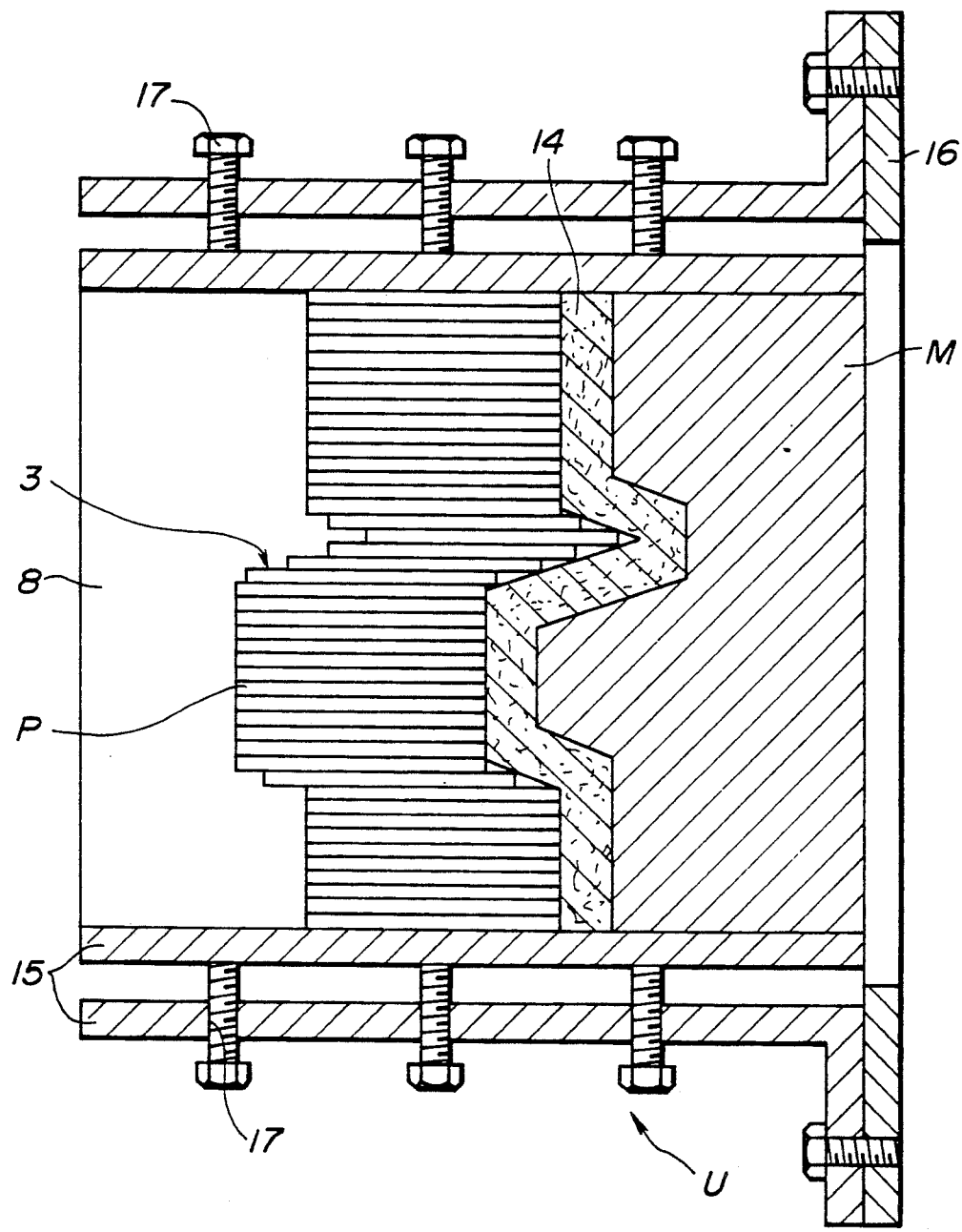

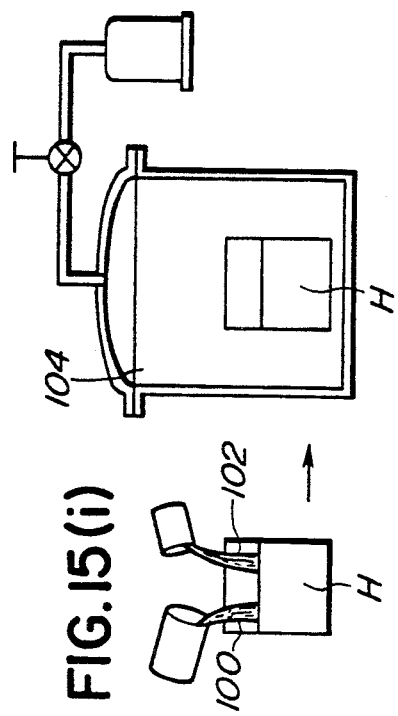
FIG.15(i)
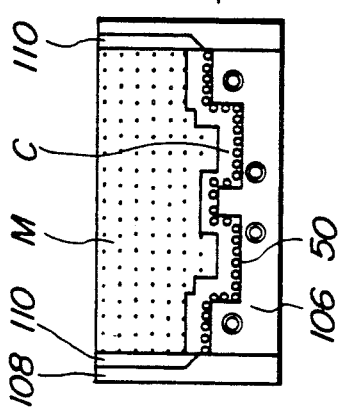
FIG.15(ii)
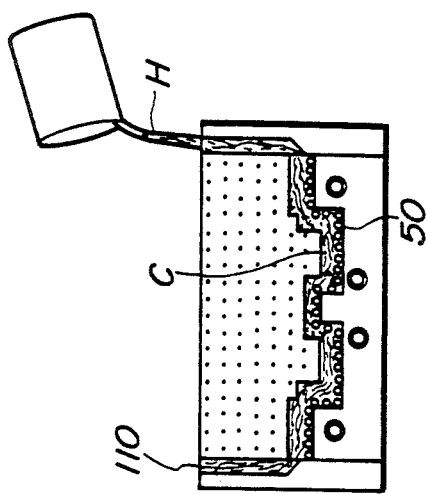
FIG.15(iii)
FIG.15(iv)
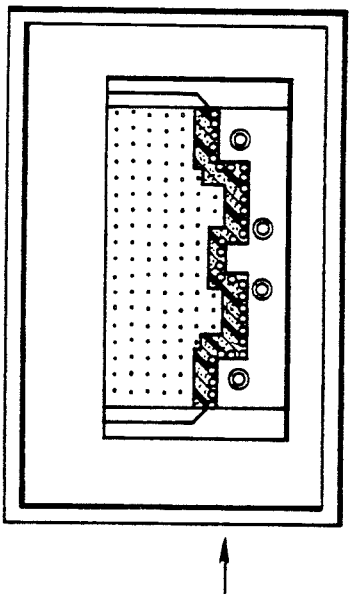
FIG.15(v)
FIG.15(vi)
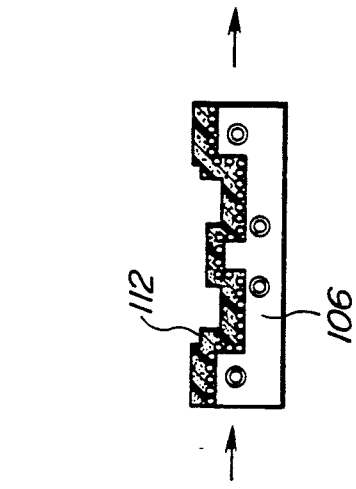
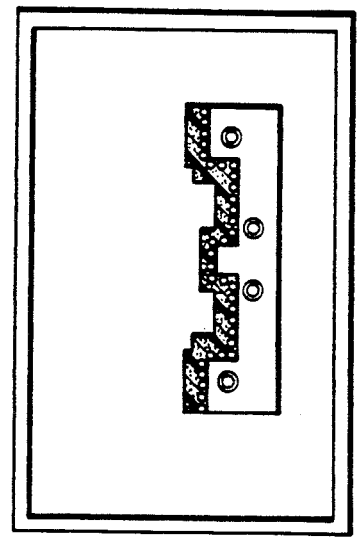
FIG.15(vii)

METAL-POWDER FILLED EPOXY RESIN MOLD

BACKGROUND OF THE INVENTION

1. Field of the Invention

The present invention relates in general to molds or dies constructed of epoxy resin which are used for molding plastic articles or pressing metal plates. More specifically, the present invention is concerned with durable epoxy resin molds particularly suitable for use in an injection molding which subjects the molds to very high injection pressure. Furthermore, the present invention relates to methods of producing the molds and the dies.

2. Description of the Prior Art

Nowadays, for easiness in production and shaping, plastic molds have been given wide attention in the field of plastic molding. Usually, as the materials of the molds, thermosetting resins, such as epoxy resin, urethane resin, silicon resin and the like are used. Among them, epoxy resin is the best for the marked hardenability and the excellent properties of the fully cured epoxy resin.

However, the epoxy resin molds hitherto used or proposed have failed to satisfy the need for facilitating the work with which the molds are produced and having a durability which the cured epoxy resin must have. Thus, hitherto, the practical use of the epoxy resin molds has been limited to only the use in a trial molding line.

In fact, since the liquid composition of the epoxy resin has a marked viscosity, the work for pouring the liquid composition into a mold-producing die unit and that for degassing the composition are difficult or at least troublesome. Furthermore, since the composition of the epoxy resin requires a relatively high curing temperature, undesired deformation of a master model, which is used when assembling the mold-producing die unit, tends to occur.

Furthermore, the epoxy resin molds hitherto used and proposed have failed to exhibit a satisfied heat resistance at 150° C. Particularly, the epoxy resin molds could not exhibit a satisfied resistance against the environment in which so-called thermal shocks continuously occur.

In view of the above, various attempts have been made for improving the performance of the epoxy resin molds. Some of the attempts are disclosed in Japanese Patent First Provisional Publications Nos. 63-278808 and 63-270104.

In the former publication, a measure is shown in which various whiskers are used for reinforcing the epoxy resin mold. However, the whisker-mixed liquid composition of the epoxy resin shows a marked viscosity causing a difficulty of the composition pouring work.

In the latter publication, there is shown a method for producing molds which are constructed of thermosetting resins. However, similar to the case of the former publication, the composition used has a marked viscosity and thus makes the above-mentioned composition pouring and degassing works difficult.

SUMMARY OF THE INVENTION

In order to resolve the above-mentioned drawbacks, the inventors have carried out various tests and experiments and finally found out the following advantageous facts.

First, when the liquid composition for epoxy resin has a suitable amount of metal powder dispersed therein, the finished product, viz., the metal-powder filled epoxy resin mold can exhibit an excellent performance which is not expected from the conventional epoxy resins.

Second, when the metal-powder filled liquid composition is degassed sufficiently, the resin mold thus produced can have a dense structure without voids. The presence of the voids is examined by the naked eye or an optical microscope. It is to be noted that the voids mentioned in this description are those whose sizes are greater than 0.1 mm. Examination has revealed that when the epoxy resin mold or die contains over 10 voids per 100 $cm^3$, the mechanical strength of the same is markedly lowered.

Third, when the hardening agent for the liquid epoxy resin material is selected from liquid agents, such as liquid amine hardening agents, acid anhydrides and the like, the hardened resin can have a dense and voidless structure.

The liquid epoxy resin material may be selected from glycidylamines, such as, bisphenol A type epoxy resin, bisphenol F type epoxy resin, novolak phenol type epoxy resin, tetra-glycidyl-dichlorohexylamine and the like. Of course, two or more in the glycidylamines may be used in combination as the liquid epoxy resin. Bisphenol A type epoxy resin, bisphenol F type epoxy resin and tetra-glycidyl-dichlorohexylamine are preferable. If desired, suitable diluents may be used for lowering the viscosity of the liquid epoxy resin composition.

The liquid amine hardening agent may be selected from aliphaticpolyamines, such as, diethylenetriamine, triethylenetetramine and the like, or from cycloamines, such as, isophoronediamine, cyclohexylamine, bis(4-amino-3-methylcyclohexyl)methane, bis(4-aminocyclohexyl)methane and the like, or from aromatic amines, such as, methaxylenediamine, diaminodiphenylmethane, diaminodiphenylsulfone and the like. Of course, eutectic mixture of two or more in them may be used as the liquid amine hardening agent. Preferably, either the eutectic mixture of diaminodiphenylmethane and bis(4-amino-3-methylcyclohexyl)methane or the eutectic mixture of diaminodiphenylmethane and bis(4-aminocyclohexyl)methane is used.

Fourth, when liquid amine hardening agent is used, 0.5 to 2 equivalent of active hydrogen of amine must be used per 1 equivalent of epoxy radical of the epoxy resin.

Fifth, the acid anhydride may be selected from phthalic anhydride, hexahydrophthalic anhydride, methyltetraphthalic anhydride, methylnadic anhydride and the like. When the acid anhydride is used, suitable hardening accelerator is preferably used.

Sixth, the metal powder dispersed in the produced epoxy resin mold increases not only the mechanical strength of the mold but also the heat transfer coefficient of the same. Aluminium, copper, iron, gold, silver, nickel, chromium and the like are usable as the material of the metal powder. The particles of the metal powder have a mean diameter smaller than 50 $\mu m$ (micron). If metal powder having a mean diameter larger than 50 micron, precipitation of the powder becomes marked and thus the mechanical strength of the produced epoxy resin mold is lowered. Preferably, a mixture of 95-50% by weight of metal powder having a mean diameter of at least 40 micron, preferably 40–75 micron, and 5–50% by weight of metal powder having a diameter of not greater than 20 micron, preferably 1–20 micron, are used. Due to presence of the metal powder, the produced epoxy resin mold exhibits a satisfied resistance against an environment in which thermal shock takes place repeatedly.

FIGS. 13A, 13B and 13C show one of washer test pieces which were used for testing the metal-powder filled cured epoxy resin against the thermal shock environment. For producing each test piece, an insert structure was prepared, which includes semicircular metal plate 30 having three openings formed therethrough and three pairs of bolts 31 and nuts 32 fixed to the plate 30 at the respective openings. Then, the insert structure was put into a cylindrical mold cavity, and a liquid epoxy resin composition 33 was poured into the mold cavity and curd under a given condition. The test pieces produced have each size as denoted by letters "l" and "h", in which l1=25 mm, l2=12.5 mm, l3=10 mm, l4=60 mm, l5=15 mm, l6=10 mm, h1=4 mm and h2=5 mm. The thermal shock test was carried out under a condition wherein sudden temperature changes between $-20°$ C. and 120° C. were repeated.

Seventh, when the amount of metal powder in the cured epoxy resin layer is above 30 % in volume, desired result is obtained.

Eighth, when selection of the liquid epoxy resin material and liquid curing agent is appropriately made, it become possible to provide the produced epoxy resin mold with a high heat resistance. In fact, some of the epoxy resin mold according to the present invention have a heat distortion temperature (HDT) above 150° C. (ASTM D648).

In addition to the above, the inventors have found the following advantageous facts by producing and testing halves of verious molds, each half including a back-up member and an epoxy resin layer intimately covering a surface of the back-up member.

First, when 5 to 45% by volume of metal balls ($10^{-3}$ cm$^3$ to 10 cm$^3$) are contained in the epoxy resin layer near the back-up member, the bonding between the layer and the back-up member is assured. Metal balls are aluminium, iron, copper, nickel or lead balls.

Second, when metal powder, such as aliminium powder, copper powder or iron powder is dispesed in the resin layer, the bolding is much assured. Preferably, aluminium powder or iron powder is used. In this case, 10–70% by volume of the metal powder is used for the resin layer, preferably, 30–60% by volume of the metal powder is used.

Third, when the metal balls used have sizes ranging from $10^{-2}$ cm$^3$ to 1 cm$^3$, excellent bonding is expected.

Fourth, when the metal balls are constructed of magnetic material, it is preferable to provide the back-up member with magnet members.

Fifth, preferably, the metal balls have rough surfaces. For roughening the surfaces, phosphate treatment may be used.

In addition, the inventors have found the following advantageous facts from various test and experiments.

First, When the epoxy resin mold has a surface electrically plated with metal, the durability of the mold is much improved. For this metal plating, a conductive paint is applied to the surface of the epoxy resin mold before effecting the electric metal plating.

Second, when metal balls are contained in the resin, the mechanical strength of the same is much increased.

The metal balls are aluminium, iron, copper, nickel or lead balls.

Third, the conductive paint should have a volume resistivity less than 1Ω cm. Preferably, the volume resistivity of the paint is within a range from $10^{-2}$Ω cm to $10^{-5}$Ω cm.

Fourth, the conductive paint may be a polymer having a volume resistivity less than 1Ω cm, which polyer is for example, polyacetylene, polyparaphenylene, polyaniline, polypyrrole, polythiophene resin or the like. Furthermore, the conductive paint may a polymer which contains therein metal powder. The metal powder may be gold, plutinum, silver, copper, nickel, or aluminium powder.

Fifth, preferably, the conductive paint includes the same resin as the resin from which the mold is produced and 60 to 90 parts by weight of copper or nickel powder.

Sixth, the conductive paint must have a thickness about 50 μm to 1.0 mm when dried and hardened.

Seventh, the metal plating may be nickel, chromium, copper or zinc plating.

Eighth, the thickness of the plated metal must range from 50 μm to 500 μm. Preferably, the thickness ranges from 50 μm to 300 μm.

With above-mentioned advantageous facts, the present invention provides:

(1) A mold which comprises a molded structure constructed of an epoxy resin and metal powder dispersed therein, the molded structure being dense and voidless.

(2) A method of producing a mold, which comprises by steps: (a) mixing metal powder with an epoxy resin material and a hardening agent to prepare an epoxy resin composition which shows a viscosity less than 100 poise at 60° C., (b) degassing the composition; (c) pouring the composition into a mold producing die unit by such an amount that the composition covers a given part of a master model installed in the die unit; (d) maintaining the die unit together with the composition for a given time at a temperature not higher than 60° C.; and (e) removing the master model from the die unit after the composition is hardened.

(3) A mold which comprises a back-up member of metal; a molded structure constructed of an epoxy resin and metal powder dispersed therein, the molded structure being disposed on the back-up member; and 5 to 45% by volume of metal balls contained in the molded structure near the back-up member, each metal ball having a volume ranging from $10^{-3}$ cm$^3$ to 10 cm$^3$.

(4) A method of producing a mold, which comprises by steps, (a) placing a back-up member of metal in a holder in such a manner that a given surface thereof faces upward; (b) placing metal balls on the given surface by one layer; (c) placing a master model in the holder in a manner to define a given clearance between the master model and the given surface of the back-up member; (d) preparing an epoxy resin composition which includes an epoxy resin material, a hardening agent and metal powder; (e) degassing the composition and pouring the same into the given clearance; (f) curing the composition to harden the same; (g) removing the hardened composition together with the back-up member from the remainder; and (h) curing the composition to achieve a sufficient hardening of the same.

(5) A mold which comprises a molded epoxy resin structure in which metal powder is dispersed therein; an electrically conductive plastic layer covering a given surface of the structure; and a metal layer electrically plated on the conductive plastic layer.

(6) A method of producing a mold, which comprises by steps, (a) preparing a molded epoxy resin structure in which metal powder is dispersed; (b) applying a given plastic paint onto a given surface of the structure, the paint becoming conductive when cured; (c) curing the paint; and (d) immersing the structure in an electrolytic solution to achieve a metal plating thereon.

BRIEF DESCRIPTION OF THE DRAWINGS

The present invention will become more apparent from the following description when taken in conjunction with the accompanying drawings, in which:

FIG. 6 is a sectional view of a casting die unit which is used when producing the half of the mold of the still another embodiment;

FIG. 15(i)–(vii) shows a process for producing a half of the mold of FIG. 14.

DETAILED DESCRIPTION OF THE INVENTION

Figure 1:
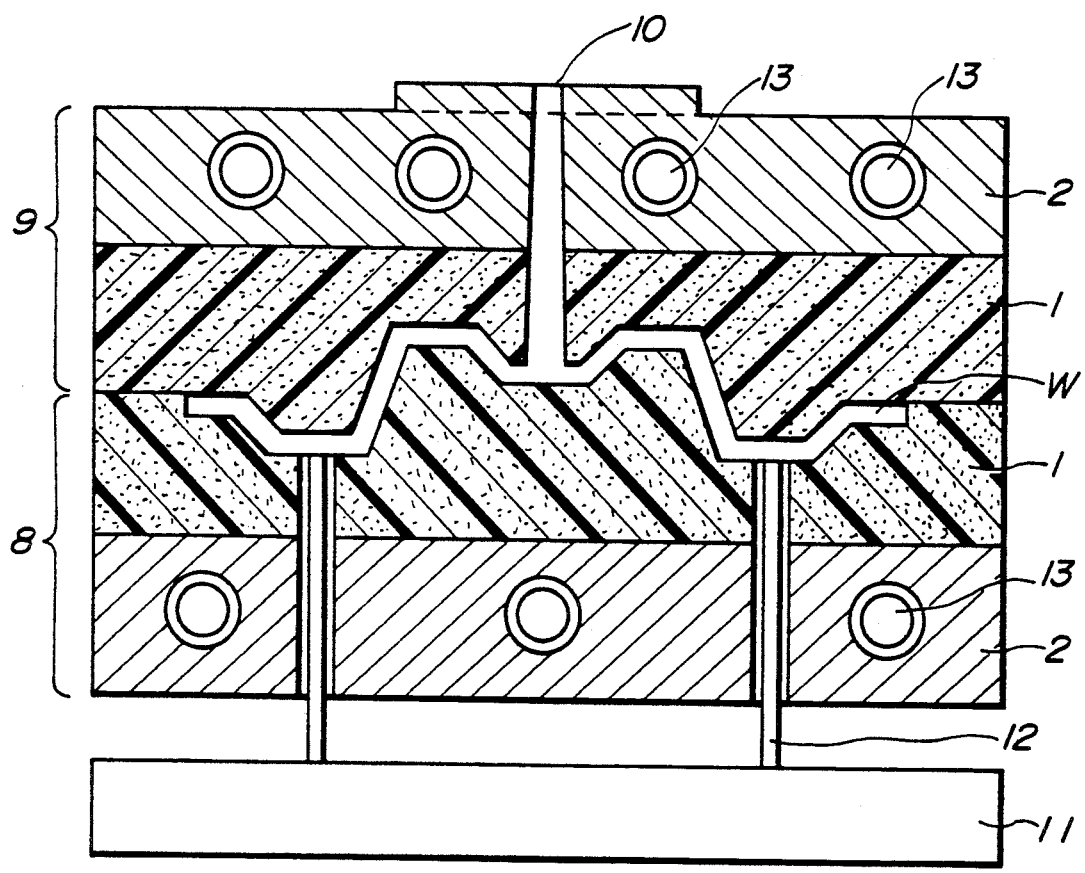
FIG. 1 is a sectional view of a mold which is an embodiment of the present invention.

In the following, a method of producing epoxy resin mold of the present invention will be described.

First, a master model is fixed to a suitable die frame. The master model may be an aimed product which is to be produced by using the epoxy resin mold. The master model may be constructed of a poor heat resisting material which can not keep its shape at a temperature above 60° C. For example, dried wood, synthetic resin, gypsum, ABS resin, silicone resin, acrylic resin, epoxy resin or the like is usable as the material of the master model. If desired, such model may be constructed of iron, aluminium, copper alloy or the like. A suitable mold releasing agent is applied to an outer surface of the master model.

Then, epoxy resin composition is prepared. For this preparation, metal powder is homogeneously mixed with non-cured epoxy resin material and then a suitable liquid curing agent is added to the metal powder-mixed non-cured epoxy resin material. In order to facilitate the mixing, the non-cured epoxy resin may be somewhat heated.

Then, the epoxy resin composition is sufficiently degassed and poured into the die frame to entirely cover the master mold. During this pouring process, attention should be paid not to increase the temperature of the composition above 60° C. If the viscosity of the composition is below 100 poise at 60° C., the degassing and the pouring of the same are smoothly carried out.

The composition is kept, together with the die frame, at a temperature below 60° C. With this, the metal powder mixed-epoxy resin is primarily cured and hardened.

Then, the master model is removed from the hardened resin.

Then, the hardened resin, which is thus free of the master model, can be left at a temperature higher than 100° C. With this, the hardened resin is secondarily cured.

In the following, a method of producing an epoxy resin mold of a first embodiment will be briefly described. In the first embodiment, the above-mentioned epoxy resin is used only for a surface layer of a half of the mold. That is, each half of the mold of the first embodiment comprises a back-up member and a layer of the above-mentioned metal-powder filled epoxy resin which is held by the back-up member.

A model applied with a releasing agent and the back-up member are arranged in a die unit in a manner to define a given clearance therebetween. The back-up member may be constructed of cast metal, rolled metal, low melting point metal or the like. Then, the above-mentioned metal powder filled epoxy resin composition is poured into the die unit filling the given clearance therewith. Thereafter, the above-mentioned curing step is taken for obtaining a sufficiently cured epoxy resin mold in the clearance.

A method of producing an epoxy resin mold of a second embodiment will be briefly described in the following.

The mold of the second embodiment is similar to that of the above-mentioned first embodiment except that in the second embodiment a so-called "near-net shaped" back-up member is used. In this mold, the back-up member is somewhat offset in construction with respect to the mold cavity of each half.

A master model applied with a releasing agent and the nearnet-shaped back-up member are arranged in a die unit in a manner to define a given clearance therebetween. Then, the abovementioned metal powder filled epoxy resin composition is poured into the die unit filling the clearance therewith. Thereafter, the curing step is taken.

A method of producing an epoxy resin mold of a third embodiment will be briefly described in the following. The mold of this embodiment is used for molding a less amount of finished products.

A master model is set in a holder. A plurality of steel or ceramic pins are put in the holder above the master model in such a manner that lower ends thereof are in contact with the master model causing upper ends thereof to define a shape which corresponds to the contour of the model. Then, the fagot of pins are tightend having the shaped upper ends of the pins fixed.

With this, a casting mold is defined in the holder by the fixed upper ends of the pins. Thereafter, melted metal is poured into the casting mold. With this, a back-up member of cast metal is produced.

Then the back-up member thus produced and the master model are arranged in a die unit in a manner to define a given clearance therebetween. Then, the above-mentioned metal powder filled epoxy resin composition is poured into the die unit filling the clearance therewith. Thereafter, the curing step is taken.

A method of producing an epoxy resin mold of a fifth embodiment will be described. In the fifth embodiment, one half of the mold is formed at the resin wall with crimps. For producing the crimps, a photo polymerization resin film is used. That is, the film is optically treated to provide slits therethrough. The film thus treated is stuck to the wall of epoxy mold cavity, and then a shotblasting technique is applied to the film-stuck wall to provide the resin wall with the crimps. For this technique, fine particulates of iron, sand, glass, ceramic or the like is used.

The epoxy resin mold according to the present invention can be used in various kinds of moldings which include injection molding, vacuum molding, foamable plastic molding, blow molding or the like and can be used as a die for pressing a thin metal plate constructed of, for example, steel, aluminium, copper or the like. Exemplary plastics molded by the epoxy resin mold are, for example, polyethylene, polypropylene, polystyrene, ABS resin, polyamide resin, polyester resin, polyacetal resin and acrylic resin (which are thermoplastic resins), and phenolic resin, urethane resin and epoxy resin (which are thermosetting resins).

In the following, examples of the present invention will be described in detail, which were prepared by the inventors.

EXAMPLE 1

Preparation of Epoxy Resin Composition 40 parts by weight of bisphenol A type epoxy resin (AER331: Asahikasei Kogyo Co., Ltd.), 50 parts by weight of atomized type aluminium powder (mean diameter: 42 $\mu$m) and 10 parts by weight of atomized type aluminium powder (mean diameter: 10 $\mu$m) were mixed to provide an epoxy resin material "A". 70 percent by weight of alicyclic liquid amine (WANDEMIN HM: Shinnippon Rika Co., Ltd.) and 30 percent by weight of diaminodiphenylmethane were mixed to prepare a liquid hardening agent "A".

Then, 100 parts by weight of the epoxy resin material "A" and 10 parts by weight of the hardening agent "A" were mixed and well blended and warmed to a temperature of about 50° C. Thereafter, the composition was degassed, by using a vacuum deaerator, to prepare a composition "A". At 60° C., the composition "A" showed a viscosity of about 80 poise by Brookfield type viscometer.

Preparation of Master Model

A hardened epoxy resin block (200 mm in length, 200 mm in width and 100 mm in height) was cut-shaped to provide a master model which has on an outer surface thereof raised and depressed portions (each having a height of about 1 mm to 10 mm). With the raised and depressed portions facing upward, the master model was enclosed by four iron plates (200 mm×200 mm) each being attached to one side of the model. With this, a die unit was prepared, which has a rectangular cavity defined by the model and the four iron plates. The wall surface of the rectangular cavity was applied with a releasing agent.

Molding

Cooling water pipes were set on the master model, and the above-mentioned composition "A" was poured into the cavity of the die unit and kept at 60° C. for five hours in an oven. Thereafter, the composition "A" was cooled to a degree of room temperature together with the die unit. With this, the composition "A" was primarily cured and hardened. The hardened composition "A" was thereafter released from the die unit and kept at about 180° C. for about five hours in the oven. With this, a finished epoxy resin mold was prepared. An examination by the naked eye revealed that the epoxy resin mold had a dense and voidless structure.

Endurance Test

The epoxy resin mold thus produced was then provided with a material inlet opening and fixed to an injection molding machine. A die block of zinc alloy was used as a counterpart of the mold. Using ABS resin, the injection molding machine was operated under a condition wherein the injection pressure was 300 Kg/cm$^2$ and the injection temperature was 230° C. No damage was found in the epoxy resin mold at the time of 3,000 injection shots.

Performance of the Epoxy Resin Test Piece

The test piece showed the performance which is depicted in Table 1.

TABLE 1

| Heat Destortion Temperature | 165° C. |
|---|---|
| Durability againt thermal shock* | over 5 times (OK) |

Figure 13A:
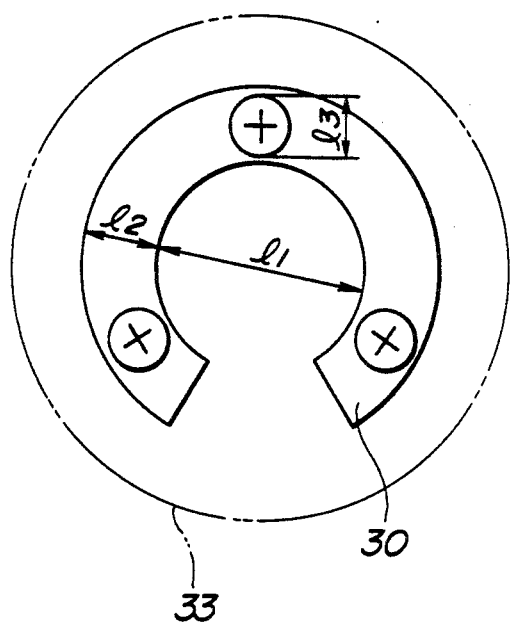
FIGS. 13A, 13B and 13C are front, side and back views of each test piece of epoxy resin used for testing the performance of various cured epoxy resins.
Figure 13B:
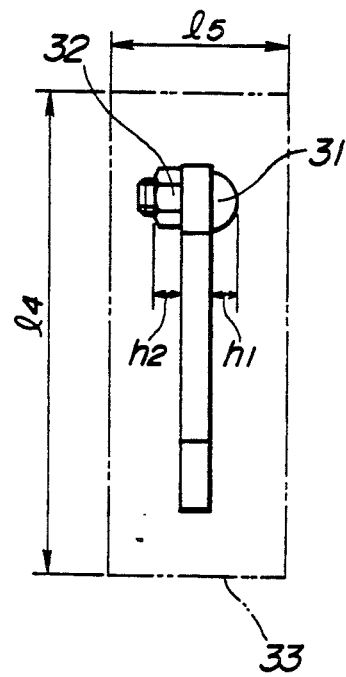
Figure 13C:
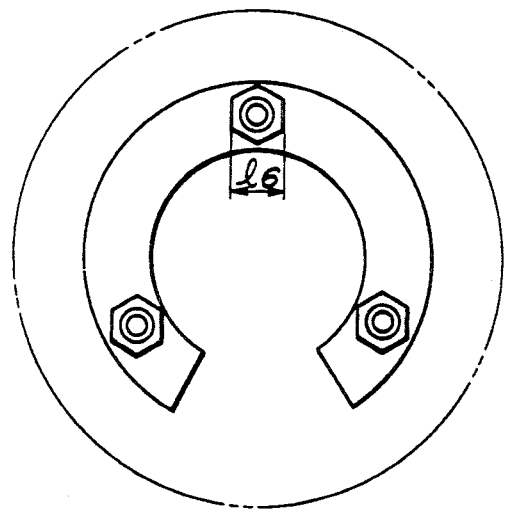

(*) . . . Each test piece had the insert structure (see FIGS. 13A to 13C) embedded therein. The test pieces were subjected to a thermal shock cycle test in which each cycle included a step for immersing the test pieces in methanol of −20° C. for 30 minutes and another step for exposing the test pieces to an open air of 120° C. for 30 minutes.

EXAMPLE 2

100 parts by weight of bisphenol A type epoxy resin (ARE331), 300 parts by weight of iron powder (mean diameter: 50 micron) and 50 parts by weight of aluminium powder (means diameter: 8 micron) were mixed to provide an epoxy resin material. Then, 25 parts by weight of the liquid hardening agent "A" (of EXAMPLE 1) was added to the epoxy resin material and well blended and degassed to prepare an epoxy resin composition.

The composition was poured into a cavity of a die producing unit and kept at 60° C. for five hours to achieve a primary curing and thereafter kept at 180° C. for two hours to achieve a secondary curing. With this process, a die was produced. By carrying out a similar process, a counterpart for the die was also produced. The die and the counterpart were fixed to a press machine and subjected to an endurance test under a condition described in Table 2. No damge was found in the die and the counterpart at the time of 1,000 press shots.

TABLE 2

| Material pressed | Cold pressed steel plate (0.8 mm in thickness) (JIS G3141 SPCC) |
|---|---|
| Press machine | 100 ton press (Crank Press) |
| Press cycle | 6 shots/min. |

EXAMPLES 3-5

Preparation of Epoxy Resin Composition.

Bisphenol F-type epoxy resin (Epicron 830: Dainippon Ink Co., Ltd.), atomized type aluminium powder (mean diameter: 45 μm) and copper powder (mean diameter: 10 μm) were well mixed to provide three kinds epoxy resin materials "B", "C" and "D" in a manner as depicted by Table 3. Then, WANDEMIN HM was added as hardening agent to each epoxy resin material to prepare epoxy resin compositions "B", "C" and "D" as the same manner as described in EXAMPLE 1. At 60° C., each composition "B", "C" or "D" showed a viscosity of about 75, 90 or 45 poise as shown in Table 3.

TABLE 3

| Epoxy Resin Composition | B | C | D |
|---|---|---|---|
| Mix. Ratio (Ps/wt.) | | | |
| BF Resin (**) | 35 | 35 | 45 |
| Aluminium Powder | 35 | 45 | 45 |
| Copper Powder | 30 | 20 | 10 |
| Hardening Agent | 7 | 7 | 9 |
| Viscosity (60° C.) Poise | 75 | 90 | 45 |

(**) Bisphenol F-type epoxy resin

Performance of the Epoxy Resin Test Pieces

Each composition "B", "C" or "D" had an insert structure embedded therein and was left at 60° C. for five hours and then left at 180° C. for five hours to provide test pieces. The test pieces produced from the compositions "B", "C" and "D" showed the performances depicted by Table 4.

TABLE 4

| Composition | B | C | D |
|---|---|---|---|
| Heat Distortion Temperature | 155° C. | 155° C. | 155° C. |
| Thermal Shock Resistance | 6< | 5< | 3 |

Molding

Epoxy resin molds were produced from the respective compositions "B", "C" and "D" by carrying out the same molding method as has been described in EXAMPLE 1.

Endurance Test

The mold thus produced were each fixed to an injection molding machine and subjected to the above-mentioned injection molding test using ABS resin. The results are depicted by Table 5.

TABLE 5

| Composition | B | C | D |
|---|---|---|---|
| Endurance (Number of Injection Shots) | 3,500 | 3,5000 | 2,500 |

EXAMPLE 6

Preparation of Epoxy Resin Composition 20 parts by weight of bisphenol A type epoxy resin (AER331), 20 parts by weight of tetra-glycidyl-dicyclohexylamine, 2 parts by weight of styrene-butadiene block polyme and 60 parts by weight of copper powder (mean diameter:50 μm) were well to prepare an epoxy resin material "E". 32 parts by weight of liquid acid anhydride (KAYAHARD MCD: Nihon Kayaku Co., Ltd) and 0.5 parts by weight of 2-methylimidazole were mixed to prepare a liquid hardening agent "E".

Then, 100 parts by weight of the epoxy resin material "E" and 32.5 parts by weight of the liquid hardening agent "E" were well mixed and degassed to prepare an epoxy resin composition "E". At 60° C., the composition "E" showed a viscosity of 18 poise.

Performance of the Epoxy Resin Test Piece

The composition "E" had an insert structure embedded therein and was left at 60° C. for five hours and then left at 180° C. for five hours to provide a test piece. The test piece showed the results depicted by Table 6.

TABLE 6

| Heat Distortion Temperature | 203° C. |
|---|---|
| Durability againt thermal shock | 4 cycles (OK) |

Molding

An epoxy resin mold was produced from the composition "E" by carrying out the same molding method as has been described in EXAMPLE 1.

Endurance Test

The mold thus produced was fixed to an injection molding machine and subjected to the above-mentioned injection molding test using ABS resin. No damage was found in the mold at the time of 5,000 injection shots.

REFERENCE 1

In place of the hardening agent "A" used in the above-mentioned EXAMPLE 1, 4 parts by weight of 2-methylimidazole was used to prepare an epoxy resin composition "G". This composition showed a heat distortion temperature of about 170° C. when hardened. When the hardened test piece was subjected to the above-mentioned thermal shock test, a crack was produced at a first cycle. When an epoxy resin mold produced from the composition "G" was subjected to an injection molding test using ABS resin, a deformation was found in a projected part of the mold at the time of ten shots.

REFERENCE 2

When, in producing the mold of EXAMPLE 1, the epoxy resin composition "A" was cured at 100° C. at the primary curing process, the master model was deformed. Thus, a desirable mold was not produced.

REFERENCE 3

When, in producing the mold of EXAMPLE 1, the process of degassing the composition "A" was omitted, many voids were found in the finished epoxy resin mold. When the mold was subjected to the injection molding test, a crack was produced at a raised part of the mold at the time of 50 injection shots.

EXAMPLE 7

A mold as shown in FIG. 1 was produced. In the illustrated mold, denoted by numerals 9 and 8 are front and rear halves of the mold, each including a cavity defining portion 1 constructed of the epoxy resin composition "A" of EXAMPLE 1, a back-up member 2 of metal and cooling pipes 13, as shown. The front half 9 of the mold has a sprue 10 and the rear half 8 of the mold has bores through which ejecting pins 12 of an ejector board 11 pass. Denoted by reference W is a cavity defined between the cavity defining portions 1 of the front and rear halves 9 and 8 in closed condition.

For production of each half 9 or 8 of the mold, the following steps were taken.

Figure 2:
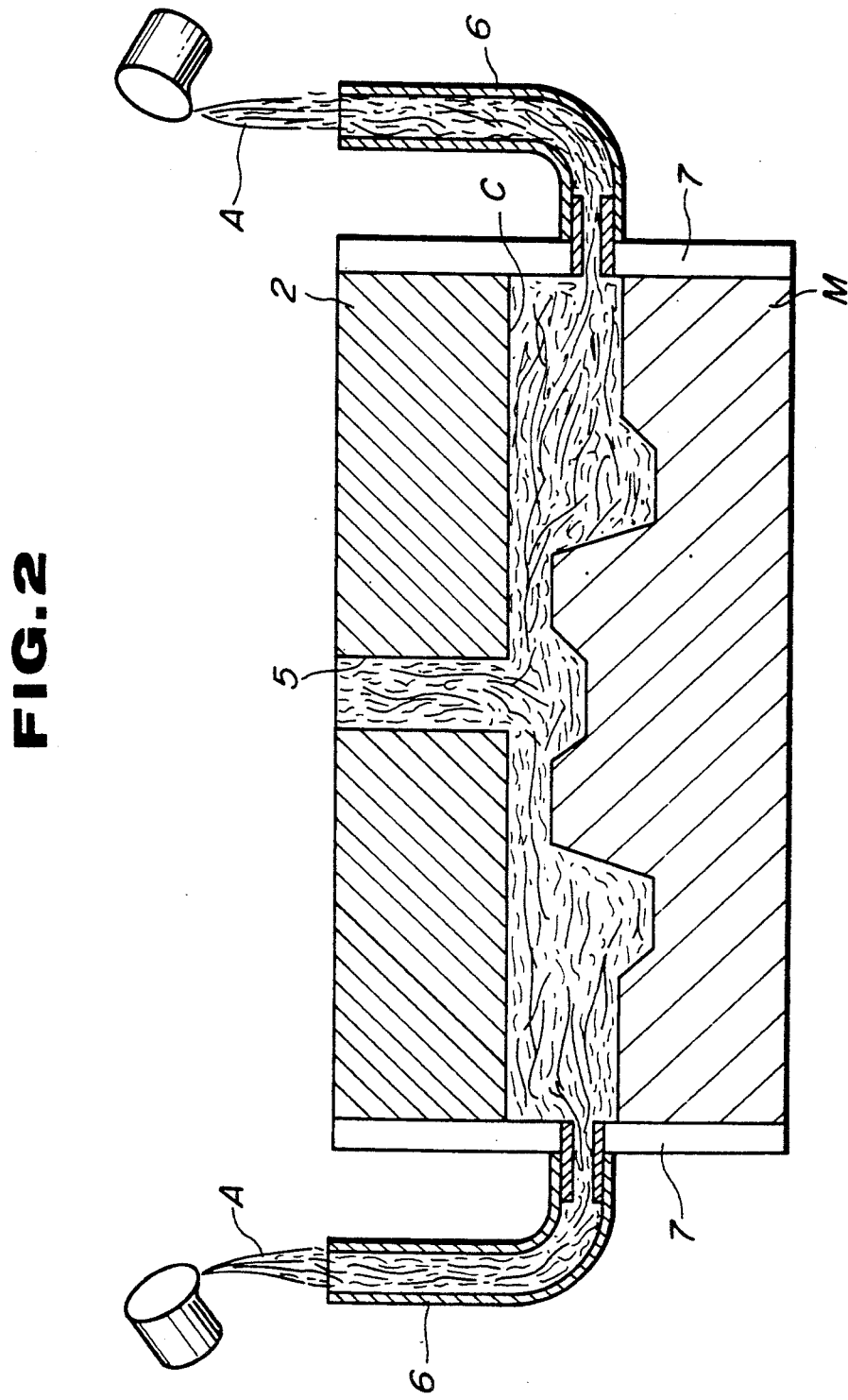
FIG. 2 is an illustration depicting the method of producing a half of the mold of the embodiment of FIG. 1.
Figure 3:
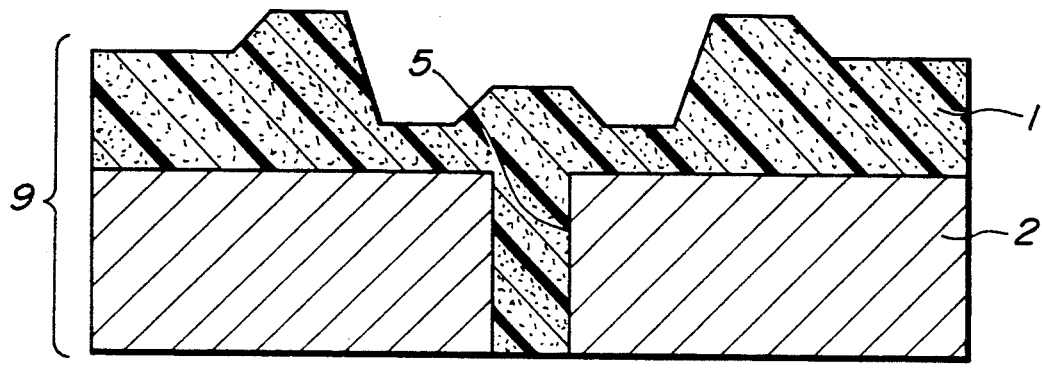
FIG. 3 is a sectional view of the half.

First, a master model "M" was produced from a dried wood and applied with a releasing agent. As is seen from FIG. 2, the back-up member 2 and the model "M" were arranged in a holder (not shown) to define therebetween a given clearance "C". The back-up member was produced via casting and had gas discharging bores 5 formed therethrough. Then, metal plates 7 were attached to both the model "M" and the back-up member 2 to enclose the clearance "C". The plates 7 had material feeding pipes 6 connected thereto. Then, the epoxy resin composition "A" was poured into the clearance "C" through the feeding pipes 6. Then, the unit consisting of the master model "M", the back-up member 2, the plates 7 and the composition "A" was left at about 60° C. for a given time in an oven. With this, the composition "A" was primarily cured. Then, the model "M" and the plates 7 were removed from the remainder which is the half 9 of the mold. The half is shown in FIG. 3, which consists of the back-up member 2 and a hardened epoxy resin part 1. The half 9 thus primarily cured was then secondarily or fully cured in the oven.

The mold was fixed to an injection molding machine and subjected to the injection molding test under a condition described in Table 7. No damage was found in the mold at the time of 20,000 injection shots.

TABLE 7

| Material molded | ABS resin (230° C.) |
|---|---|
| Injection Pressure | 110 Kg/cm$^2$ |
| Mold Temperature | 80° C. |

EXAMPLE 8

Figure 4:
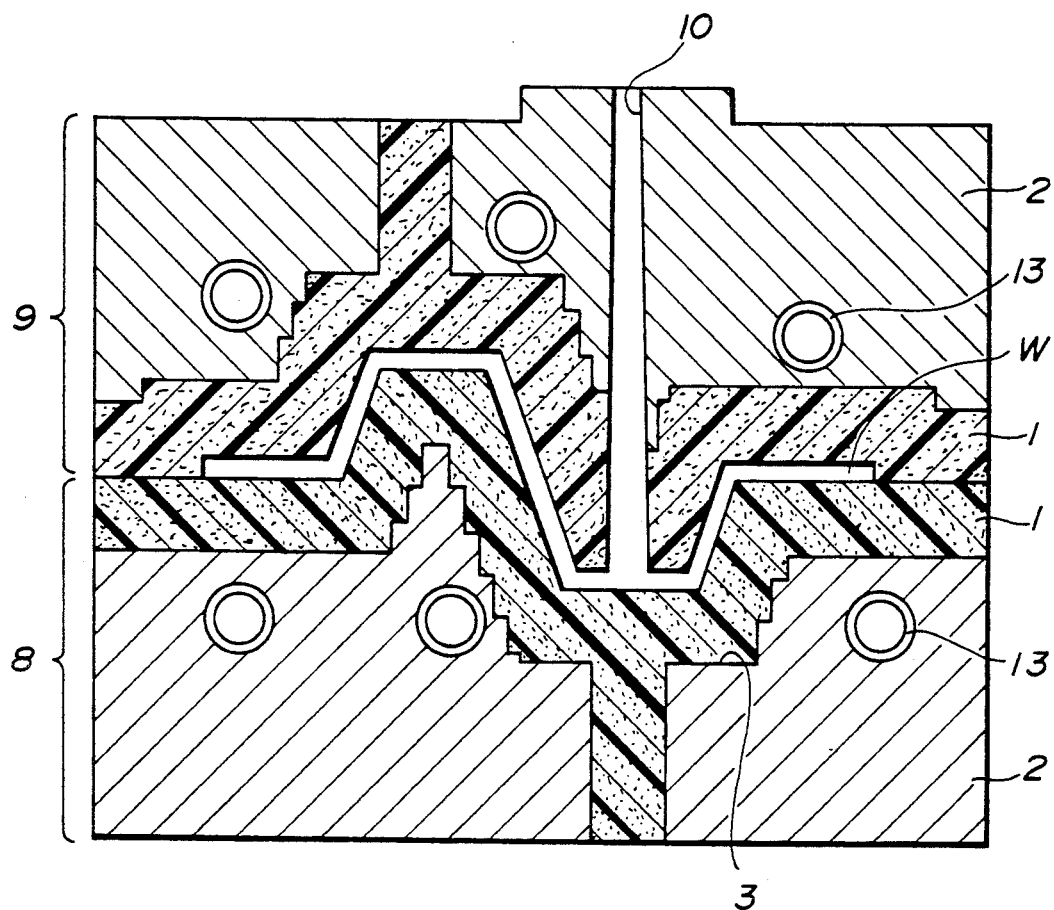
FIG. 4 is a sectional view of a mold of another embodiment of the present invention.

A mold as shown in FIG. 4 was produced. Each of front and rear halves 9 and 8 of the mold comprises an outer layer 1 produced from the epoxy composition "A" of EXAMPLE 1 and a nearnet-shaped back-up member 2 constructed of zinc alloy.

For production of each half 9 or 8 of the mold, the following steps were taken.

Figure 5:
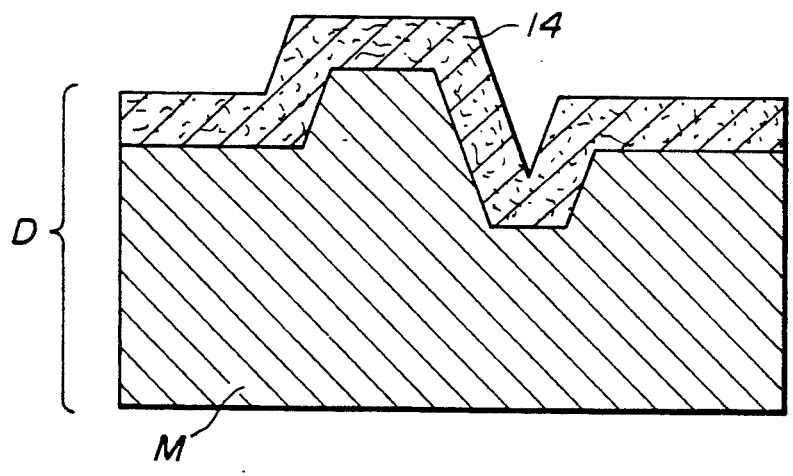
FIG. 5 is a sectional view of a master model which is used when producing a half of the mold of a still another embodiment, the master model being shown with a seat wax applied thereto.

First, a master model "M" was produced. Then, as is seen from FIG. 5, the model "M" was applied at its shaped surface with a seat wax 14 whose thickness corresponds to that of an epoxy resin outer layer which is to be produced. With this, a so-called "dummy model D" was produced. Then, as is seen from FIG. 6, the dummy model "D" was properly set in a laid-down casting die unit "U" which comprises a base member 16 and a clamping device 15. Then, a plurality of steel pins "P" of the same length were packed in the unit "U" in such a manner that inward ends of the pins are in contact with the seat wax 14. With this, outward ends of the bundle of the pins "P" has a shape 3 corresponding to the shaped surface of the dummy model "D". Then, the shaped bundle of the pins "P" was tightened together by fastening bolts 17 of the casting die unit "U". With this, a cavity 8 was defined above the shaped bundle of the pins "P".

Figure 7:
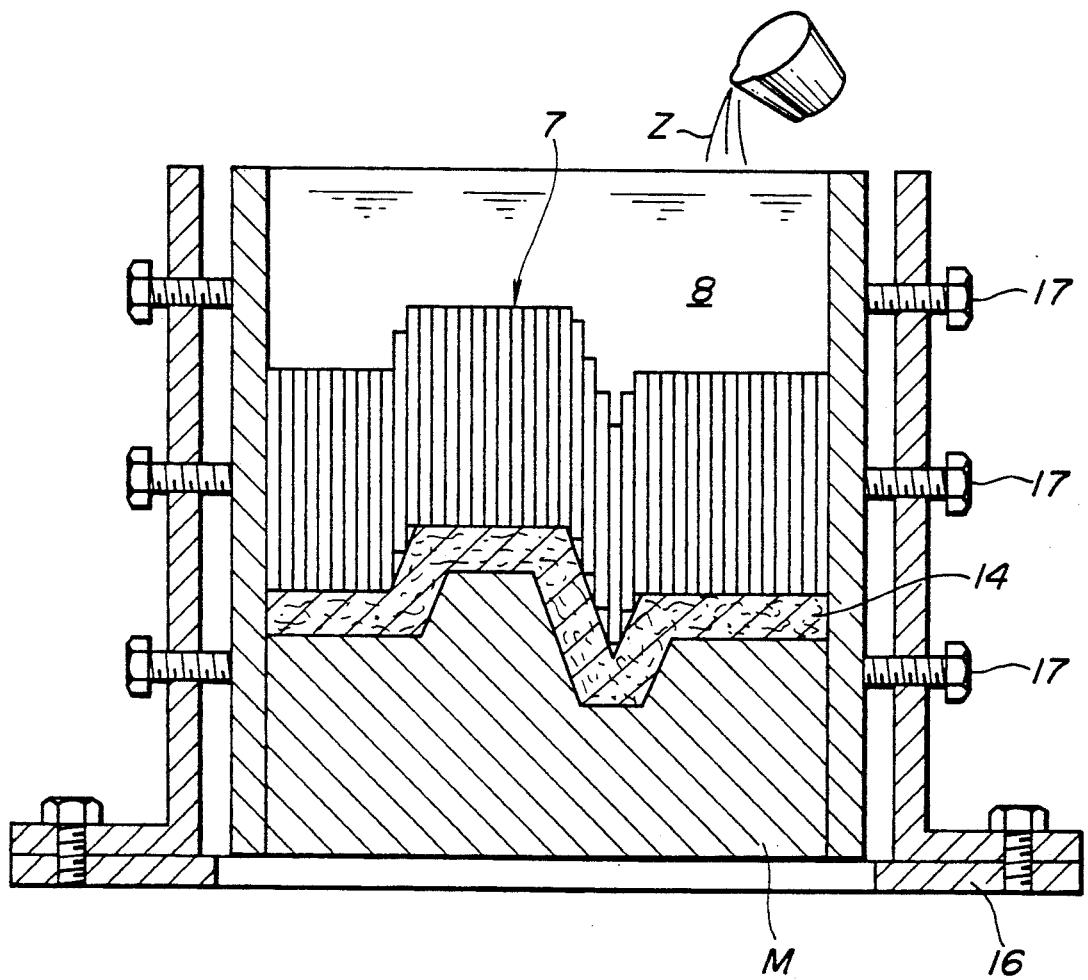
FIG. 7 is a view similar to FIG. 6, but showing a condition in which a melted alloy of low melting point is being poured into the die unit.

Then, as is seen from FIG. 7, the unit "U" was raised and applied at the wall defining the cavity 8 with a releasing agent (such as boron nitride). Then, melted zinc alloy "Z" was poured into the cavity 8. After hardening, the hardened alloy "Z" was removed from the casting die unit "U" by unfastening the bolts 17. With this, the nearnet-shaped back-up member 2 was prepared by the alloy "Z". The pins "P" and the dummy model D were removed from the disassembled unit "U".

Figure 8:
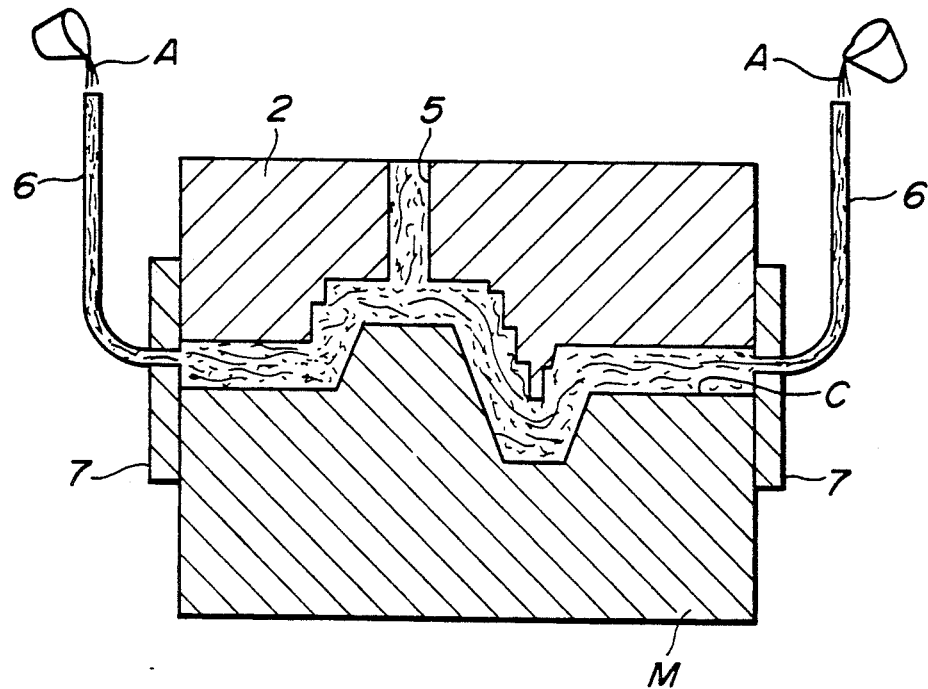
FIG. 8 is an illustration depicting the method of producing the half of the mold of the still another embodiment by using the master model.
Figure 9:
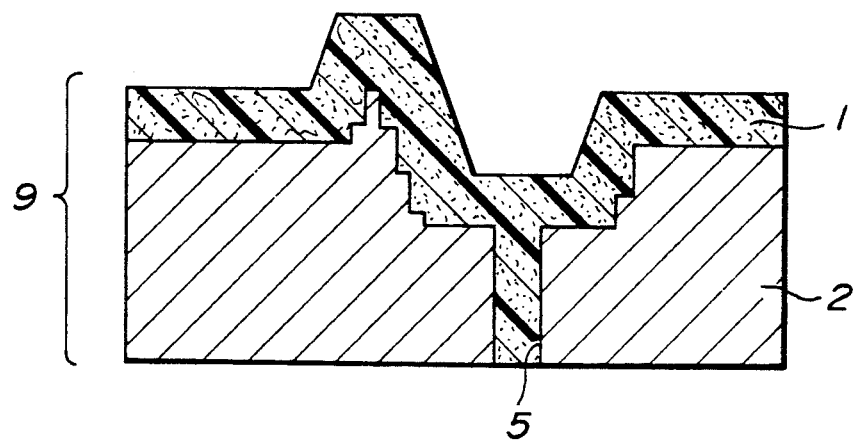
FIG. 9 is a sectional view of the half of the mold of the still another embodiment.

The seat wax 14 was removed from the model "M". Then, as is seen from FIG. 8, the casted back-up member 2 and the model "M" were arranged in a holder (not shown) in a manner to define a given clearance "C" therebetween. Then, metal plates 7 were attached to both the model "M" and the back-up member 2 to enclose the clearance "C". Then, the epoxy resin composition "A" was poured into the clearance "C" through feeding pipes 6. The composition "A", together with the model "M", the back-up member 2 and the plates 7, was left at about 60° C. for a given time in an oven. Then, the model "M" and the plates 7 were removed from the remainder which is the half 9 or 8 of the mold. The half is shown in FIG. 9, which consists of the back-up member 2 and the hardened epoxy resin outer layer 1. The half thus primary cured was then secondarily or fully cured in the oven.

The mold was fixed to an injection molding machine and subjected to the injection molding test under the same condition as the afore-mentioned EXAMPLE 6. No damage was fond in the mold at the time of 20,000 injection shots.

EXAMPLE 9

Figure 10:
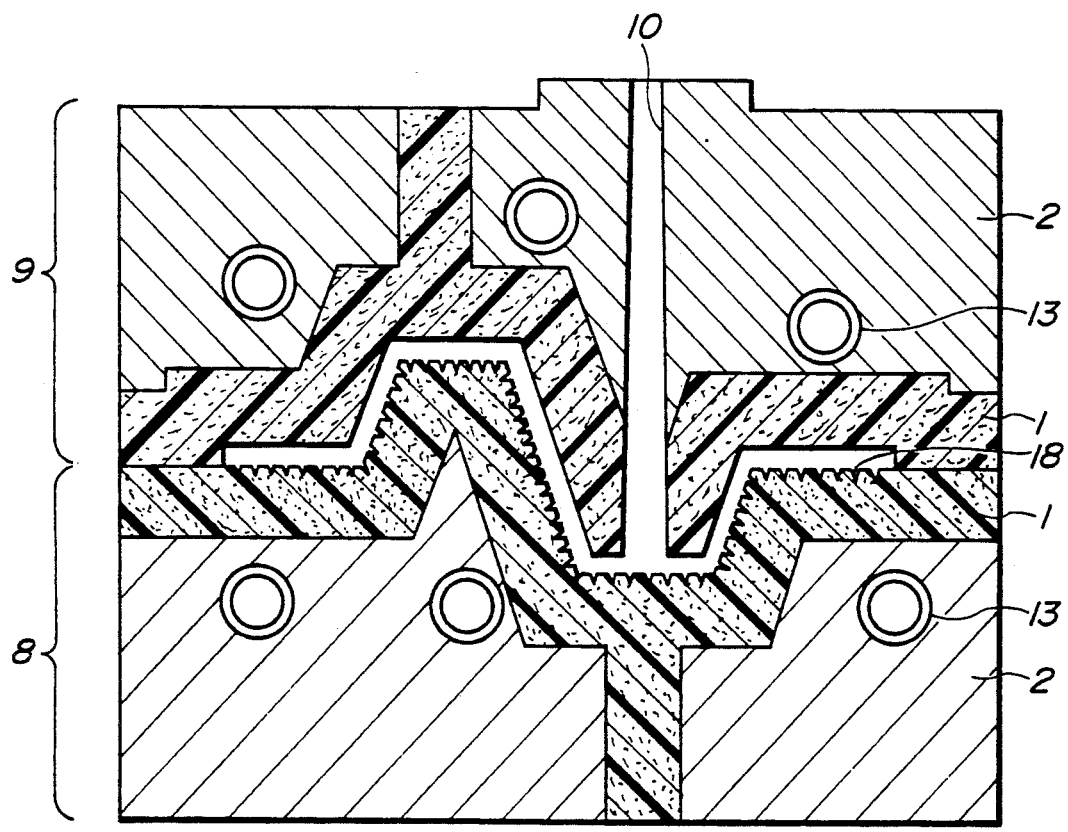
FIG. 10 is a sectional view of the mold of a further embodiment of the present invention, a half of the mold being shown provided with crimps on the surface thereof.

A mold as shown in FIG. 10 was produced. Each of front and rear halves 9 and 8 of the mold comprises an outer layer 1 of epoxy resin and a back-up member 2 of metal.

The halves 9 and 8 were produced in substantially the same manner as in case of EXAMPLE 8, except the after-mentioned steps applied to the rear half 8 of the mold.

That is, in EXAMPLE 8, additional steps were carried out for providing the epoxy resin layer 1 of the rear half 8 with crimps or grains.

The epoxy resin layer 1 of the rear half 8, when fully cured, showed a Rockwell hardness of 166 μm in M-scale, which was suitable for bearing a shotblasting.

Figure 11:
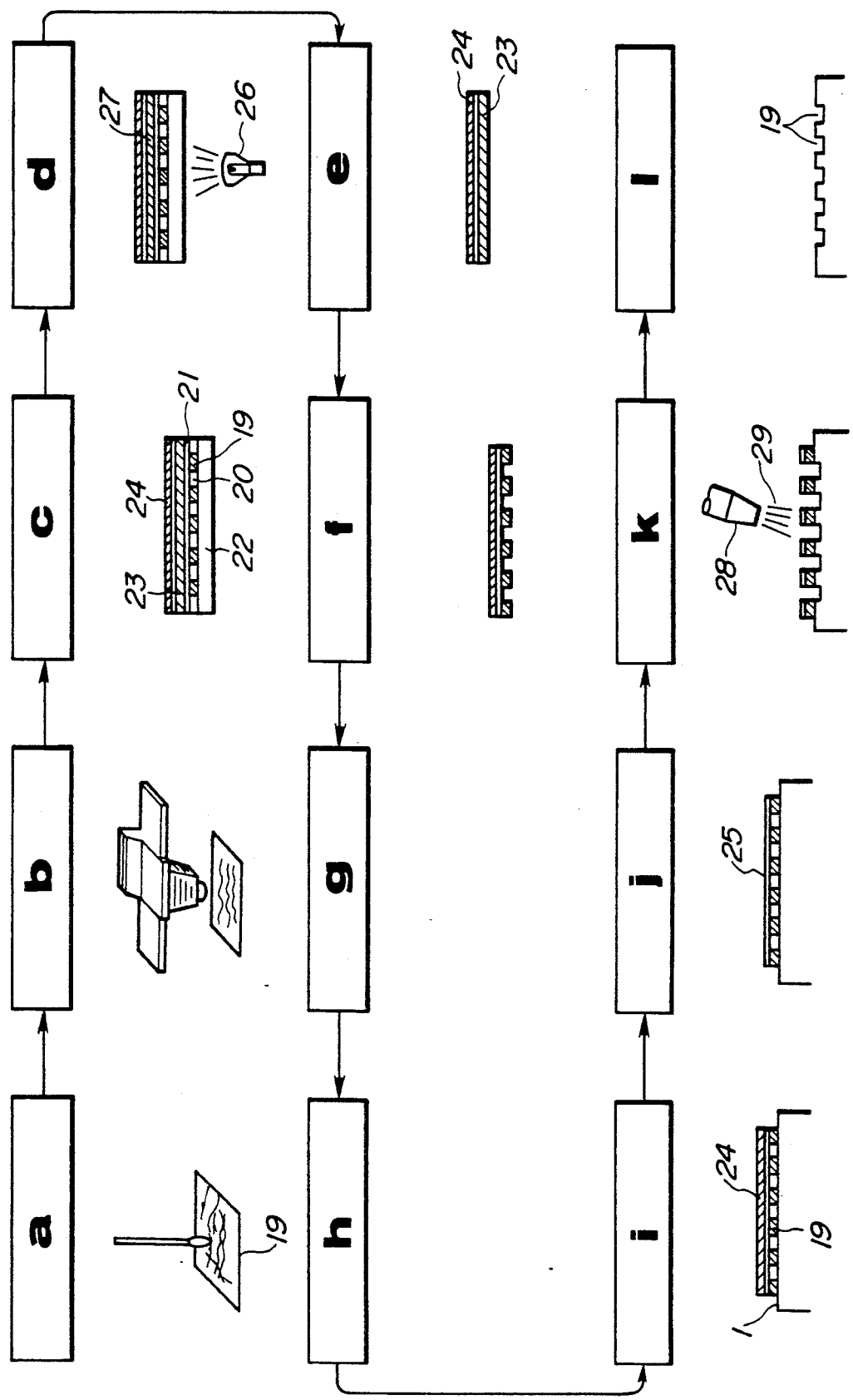
FIG. 11 shows a process for providing the half of the mold with the crimps.
Figure 12:
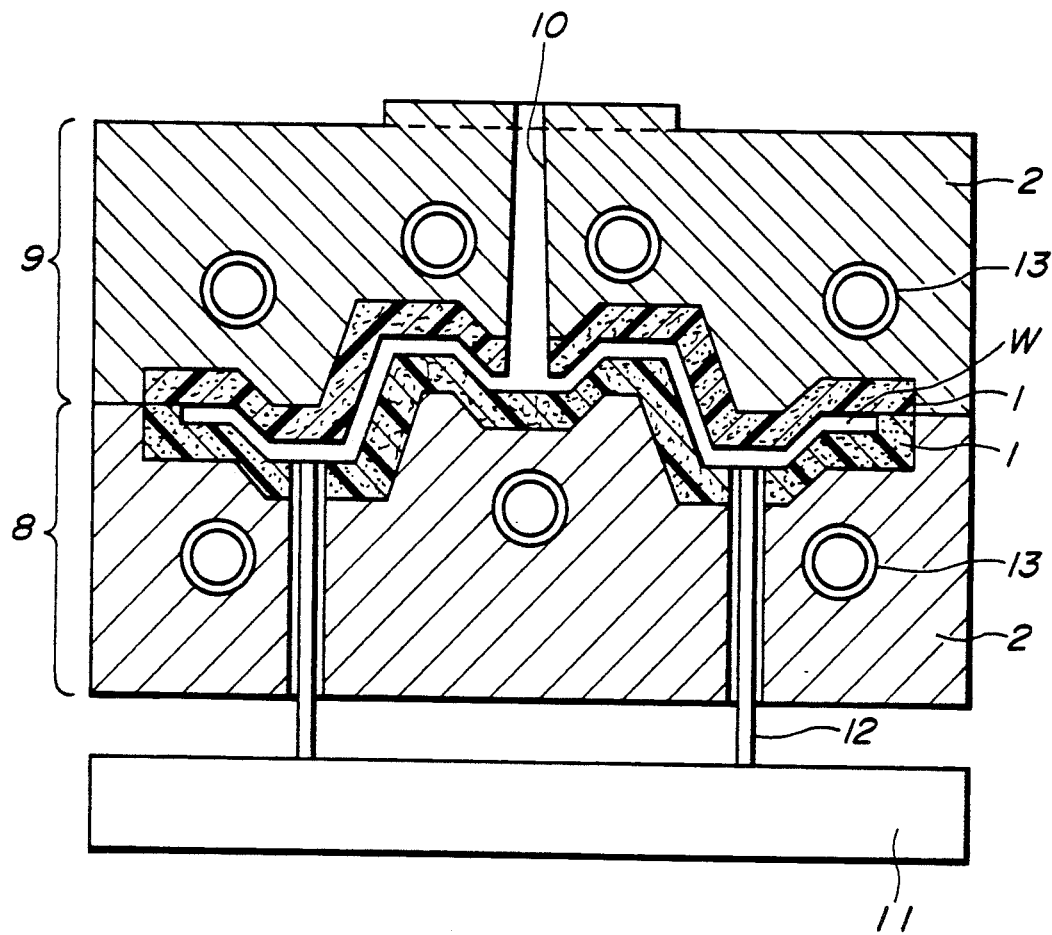
FIG. 12 is a sectional view of a conventional mold.

The additional steps are depicted in FIG. 11. As shown in this drawing, at step "a", suitable pattern 19 for the crimps was drawn on a paper. The pattern 19 was photographed (step "b"). At step "c", the developed film 20 on which the image of the pattern 19 was carried was put on a glass plate 22 and a cover film 21 was put on the developed film 20. Then, a photosensitive resin material 23 was applied to an upper surface of the cover film 21, and a base film 24 was put on the photosensitive resin layer 23. Then, at step "d", the photosensitive resin layer 23 was exposed to a light for a given time, the light being produced by an electric lamp 26 positioned behind the glass plate 22. Then, the base film 24 was removed from the remainder. With this, the base film 24 had on its lower surface the photosensitive resin layer 23 stuck thereto (step "e"), the layer 23 having cured portions exposed to the light and non-cured portions blocked from the light. Then, the base film 24 was washed in water to remove the non-cured portions of the layer 23 from the base film 24 (step "f"). With this, the base film 24 had a pattern of the crimps, which was provided by the cured portions of the photosensitive resin layer 23. After drying (step "g"), the base film 24 was exposed to the light again for strengthening the pattern (step "h").

Then, the base film 24 was affixed to the cavity defining surface of the epoxy resin layer 1 of the rear half 8 of the mold in such a manner that the hardened pattern was interposed therebetween (step "i"). Then, the base film proper was removed from the epoxy resin layer 1 leaving the pattern on the epoxy resin layer 1 (step "j").

Then, glass powder 29 was blown against the pattern-mounted surface of the epoxy resin layer 1 by using a shotblasting machine 28. This shotblasting was carried out under a condition wherein the diameter of each particle of the glass powder was about 50 $\mu$m to 100 $\mu$m, the shot pressure was about 3 Kg/mm$^2$ and the shot distance (viz., the distance between the gun and the surface of the layer 1) was about 100 mm to 150 mm. With this, crimps were formed on the surface 18 of the epoxy resin layer 1 as is seen from FIG. 10.

The mold thus produced was fixed to an injection molding machine and subjected to the injection molding test under the same condition as the afore-mentioned EXAMPLE 7. No damage was found in the mold at the time of 20,000 injection shots.

EXAMPLE 10

Figure 14:
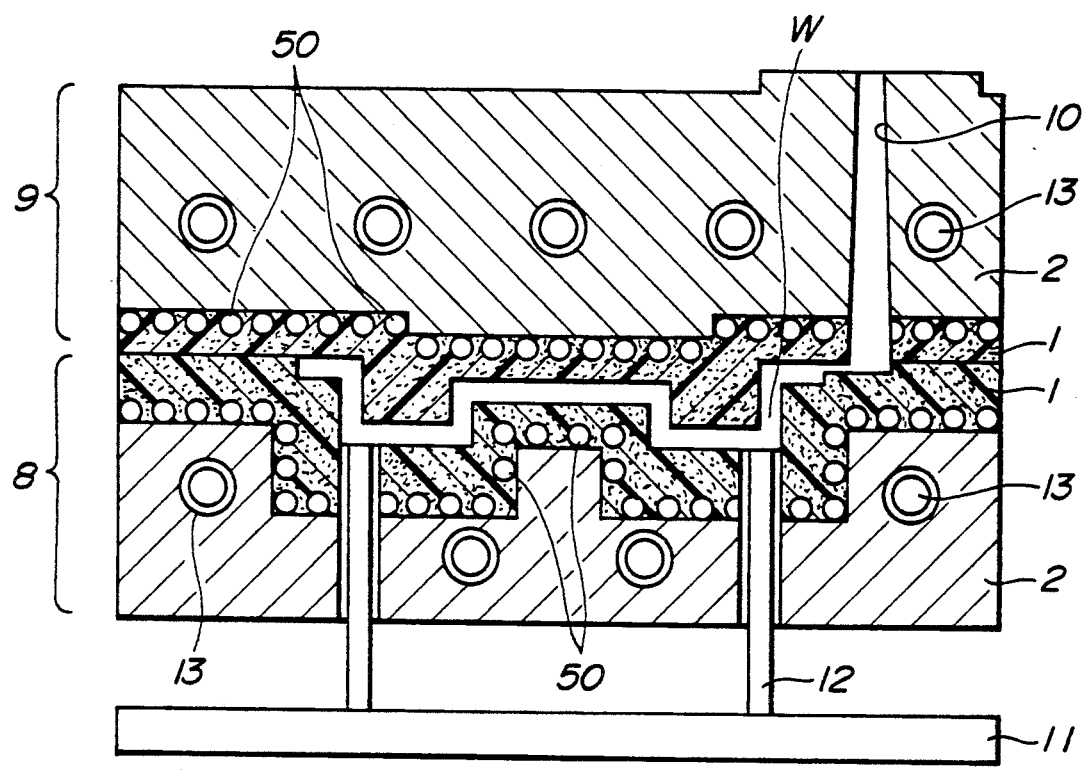
FIG. 14 is a sectional view of a mold of a further embodiment of the present invention.

A mold as shown in FIG. 14 was produced. In the mold of this example, metal balls 50 were used for assuring the bonding between the epoxy resin layer 1 and the back-up member 2.

For production of each half 9 or 8 of the mold, the following steps were taken, which will be described in the following with reference FIG. 15.

First, a back-up member 106 was produced by cut-shaping an iron block (200 mm × 200 mm × 150 mm) and set in a holder 108 (as may be understood from step "iii") having a shaped surface thereof directed upward. A plurality of aluminium balls (5 mm in diameter) were laid by one layer on the shaped surface of the back-up member 106. A model "M" (200 mm × 200 mm × 100 mm) was prepared and applied at its shaped surface with a releasing agent. The model "M" was set in the holder 108 above the back-up member 106 in a manner to define therebetween a given clearance "C" (about 10 mm in thickness). Then, metal plates were attached to both the model "M" and the back-up member 106 to enclose the clearance "C". Four material feeding openings 110 leading to the clearance "C" were produced.

Epoxy resin composition "H" was prepared. For this preparation, a liquid epoxy resin material 100 in which metal powder had been homogeneously dispersed was mixed with a hardening agent 102 to prepare the epoxy resin composition "H" (step "i"). The composition "H" contained 20% by volume of aluminium powder (mean diameter: 30 $\mu$m) and 20% by volume of iron powder (mean diameter: 50 $\mu$m). Then, the composition "H" was degassed in a vacuum chamber 104 (step "ii") and maintained at about 60° C. At 60° C., the composition "H" showed a viscosity of about 90 poise.

As is seen from the drawing of step "iv", the composition "H" was poured into the clearance "C" through the four feeding openings 110. Thereafter, the composition "H" was left at 60° C. for five hours in an oven, and thereafter, the model "M" was removed from the remainder which is the half 8 of the mold. The half 8 is shown at step "vi", which comprises the back-up member 106 and a primarily cured epoxy resin layer 112. Thereafter, the half 8 was left at 180° C. for three hours in the oven (step "vii"). With this, the epoxy resin layer 112 was sufficiently cured.

The aluminium balls contained in the fully cured epoxy resin layer 112 was about 28% by weight.

The mold was fixed to an injection molding machine and subjected to the injection molding test under a condition described in Table 8. No damage was found in the mold at the time of 2,000 injection shots. The heat conductivity of the mold was about 5.2 Kcal/m.hr° C.

TABLE 8

| Material molded | ABS resin |
| --- | --- |
| Injection temperature | 230° C. |
| Mold temperature | 60° C. |
| Mold surface temperature | 65° C. |
| Molding cycle | 2 min./shot |

REFERENCE 4

For producing a mold of this reference, the same method as that of the above-mentioned EXAMPLE 10 was carried out except that in REFERENCE 4, the aluminium balls were not used. Undesirable separation of the epoxy resin layer (112) from the back-up member (106) occurred at the time when the half (8) was took out from the 180° C. oven and cooled to a room temperature.

EXAMPLE 11

For producing a mold of this reference, the same method as that of the above-mentioned EXAMPLE 10 was carried out except that in EXAMPLE 11, the diameter of the aluminium balls was 2 mm. The aluminium balls contained in the fully cured epoxy resin layer 112 was about 16% by weight.

The mold of this EXAMPLE was subjected to the injection molding test under the same condition as the above-mentioned EXAMPLE 10. No damage was found in the mold at the time of 2,000 injection shots.

EXAMPLE 12

For producing a mold of this example, the same method as that of the above-mentioned EXAMPLE 10 was carried out except that in EXAMPLE 12, iron balls (5 mm in diameter) were used in place of the aluminium balls.

The mold of this EXAMPLE was subjected to the injection molding test under the same condition as the above-mentioned EXAMPLE 10. No damage was found in the mold at the time of 3,000 injection shots.

EXAMPLE 13

The same method as that of the above-mentioned EXAMPLE 10 was carried out except for the following.

That is, in EXAMPLE 13, the back-up member had a size of 500 mm × 500 mm × 100 mm. Iron balls (4 mm in diameter) were used in place of the aluminium balls. The master model of gypsum having a size 500 mm × 500 mm × 100 mm was used.

The used epoxy resin composition contained 60% by volume of iron powder (mean diameter: 50 μm). After pouring, the composition was left at 40° C. for three hours in an oven, and thereafter, the master model was removed from the remainder which is a half of the mold. The half was then left at 40° C. for ten hours in the oven.

The iron balls contained in the cured epoxy resin layer showed about 12% by volume.

The mold was subjected to the injection molding test under the same condition of the above-mentioned EXAMPLE 10. No damage was found in the mold at the time of 3,000 injection shots.

EXAMPLE 14

An epoxy resin mold having a surface plated with chromium was produced.

For production of this mold, the following steps were taken.

First, an epoxy resin block containing 30% by weight of aluminium powder (mean diameter: 10 micron) and 40% by weight of iron powder (mean diameter: 40 micron) was cut-shaped to prepare a mold. A conductive paint containing 80 parts by weight of copper powder, 20 parts by weight of novolak-type phenolic resin and 20 parts by weight of solvent was applied to the surface of the epoxy resin mold to form on the same a paint layer of 0.2 mm in thickness. After the paint layer was dried, the mold was left at 180° C. for 10 minutes. With this, the paint layer became hardened and conductive. The volume resistivity of the mold was $2 \times 10^{-3} \Omega$ cm.

Then, for achieving chromium plating, the mold was then immersed in an electrolytic solution including chromic anhydride (250 g/l) and sulfuric acid. A lead alloy bar was used as an anode and the hardened conductive paint layer was served as a cathode. The temperature of the solution was 50° C. and the current density was $45 A/dm^2$.

After completion of the plating, the surface of the chromium layer was polished. The thickness of the polished chromium layer was 0.5 mm.

For testing the endurance of the chromium plated mold thus produced, the same was fixed to a press machine by which a steel plate having a thickness of 0.7 mm was pressed. No damage was found in the mold at the time of 2,000 press shots.

EXAMPLE 15

A chromium plated epoxy resin mold was produced, which was substantially the same as that of EXAMPLE 14 except that in EXAMPLE 15, 30% by weight of aluminium powder (mean diameter: 40 micron) was used in place of the iron powder.

The mold was subjected to an injection molding test using ABS resin. No damage was found in the mold at the time of 5,000 injection shots.

What is claimed is:

1. A mold comprising:
   a molded structure comprising an epoxy resin and metal powder dispersed therein, wherein said molded structure is dense and substantially free from voids having a size greater than 0.1 mm and wherein said metal powder comprises 50 to 95% by weight of a first group of metal powder which has a means diameter not smaller than 40 microns and 5 to 50% by weight of a second group of metal powder which has a mean diameter not greater than 20 microns.

2. A mold as claimed in claim 1, in which said metal powder occupies 30 to 60% by volume of said molded structure.

3. A mold as claimed in claim 2, in which said metal powders of said first and said second groups are selected from the group consisting of aluminum powder, copper powder, iron powder, gold powder, silver powder, nickel powder, and chromium powder.

4. A mold as claimed in claim 3, wherein said first group of metal powders have a mean diameter of 40-75 microns, and said second group of metal powders have a mean diameter of 1-20 microns.

5. A mold as claimed in claim 4, wherein said first group comprises a metal powder different from a metal powder in said second group.

6. A mold as claimed in claim 5, wherein said first group comprises iron powder and said second group comprises aluminum powder, or said first group comprises aluminum powder and said second group comprises copper powder.

7. A mold as claimed in claim 4, where said metal powders are selected from the group consisting of iron, gold, silver, nickel, and chromium.

8. A mold as claimed in claim 1, further comprising a back-up member of metal, said back-up member having said molded structure mounted thereon.

9. A mold as claimed in claim 8, further comprising 5 to 45% by volume of metal balls contained in the molded structure near the back-up member, said metal balls each having a volume ranging from $10^{-3} cm^3$ to 10 $cm^3$ and, said metal balls selected from the group consisting of iron, aluminum, copper, nickel, and lead balls.

10. A mold as claimed in claim 9, wherein substantially all of said metal balls are arranged near the back-up member so as to improve the bonding between said back-up member and said molded structure.

11. A mold as claimed in claim 1, in which said epoxy resin is selected from at least one of the group consisting of bisphenol A type epoxy resins, bisphenol F type epoxy resins, novolak phenol type epoxy resins and tetra-glycidyl-dichlorohexylamine.

12. A mold as claimed in claim 1, further comprising:
   an electrically conductive plastic layer covering a given surface of said structure; and
   a metal layer electrically plated on the conductive plastic layer.

13. A mold as claimed in claim 12, wherein said conductive plastic layer has a volume resistivity of less than 1Ω cm, and a thickness of about 50 microns to 1.0 mm and comprises a polymer selected from the group consisting of polyacetylene, polyparaphenylene, polyaniline, polypyrrole, and polythiophene.

14. A mold as claimed in claim 13, wherein said metal layer comprises nickel, chromium, copper, or zinc.

15. A mold as claimed in claim 1, wherein, before molding, said molded structure further comprises a liquid hardening agent selected from the group consisting of amines, and acid anhydrides.

16. A mold as claimed in claim 15, in which said hardening agent is selected from the group consisting of diethylenetriamine, triethylenetetramine, isophoronediamine, cyclohexylamine, bis(4-amino-3-methylcyclohexyl)methane, bis(4-aminocyclohexyl)methane, methaxylenediamine, diaminodiphenylmethane, diaminodiphenylsulfone, eutectic mixture of diaminodiphenylmethane and bis(4-amino-3-methylcyclohexyl)methane, and eutectic mixture of diaminodiphenylmethane and bis(4-aminocyclohexyl)methane.

17. A mold as claimed in claim 15, in which said hardening agent is selected from the group consisting of phthalic anhydride, hexahydrophthalic anhydride, methyltetraphthalic anhydride, and methylnadic anhydride.

18. A mold comprising:
  a back-up member comprised of metal;
  a molded structure comprising an epoxy resin and metal powder dispersed therein, said molded structure being disposed on said back-up member; and
  5 to 45% by volume of metal balls contained in the molded structure near the back-up member, each metal ball having a volume ranging from $10^{-3}$ cm$^3$ to 10 cm$^3$.

19. A mold as claimed in claim 18, in which said molded structure is dense and substantially free from voids having a size greater than 0.1 mm, and wherein substantially all of said metal balls are arranged near side back-up member so as to improve the bonding between said back-up member and said molded structure.

20. A mold as claimed in claim 19, in which each of said metal balls has a volume ranging from $10^{-2}$ cm$^3$ to 1 cm$^3$.

21. A mold as claimed in claim 20, in which said metal balls are constructed of iron, aluminium, copper, nickel, or lead.

22. A mold as claimed in claim 21, wherein said metal powder occupies 30 to 60% by volume of said molded structure, has a mean diameter of not greater than 50 microns, and wherein said powder is selected from the group consisting of metal powders of aluminum, copper, iron, gold, silver, nickel, and chromium.

23. A mold as claimed in claim 22 further comprising:
  an electrically conductive plastic layer covering a given surface of said structure, and
  a metal layer electrically plated on said conductive plastic layer.

24. A mold as claimed in claim 23, wherein said conductive plastic layer has a volume resistivity of less than 1 Ω cm, and a thickness of about 50 microns to 1.0 mm and comprises a polymer selected from the group consisting of polyacetylene, polyparaphenylene, polyaniline, polypyrrole, and polythiophene; or a polymer which contains a metal powder selected from gold, platinum, silver, copper, nickel, or aluminum, and wherein said metal layer comprises nickel, chromium, copper, or zinc.

* * * * *